United States Patent [19]

Kaminski

[11] Patent Number: 4,584,514
[45] Date of Patent: Apr. 22, 1986

[54] HIGH FREQUENCY SWITCHING BATTERY CHARGER

[75] Inventor: Henry Kaminski, Broomall, Pa.

[73] Assignee: Allied Corporation, Morris Twp., Morris County, N.J.

[21] Appl. No.: 713,565

[22] Filed: Mar. 18, 1985

Related U.S. Application Data

[63] Continuation of Ser. No. 496,773, May 20, 1983, abandoned.

[51] Int. Cl.⁴ .............................................. H02J 7/04
[52] U.S. Cl. ........................................ 320/33; 320/37; 320/40; 320/48; 320/59; 363/41; 363/56
[58] Field of Search ................. 320/30, 31, 32, 33, 320/37, 39, 40, 48, 57, 59, DIG. 1; 363/41, 55, 56

[56] References Cited

U.S. PATENT DOCUMENTS 3,389,324 6/1968 Ballman ..................... 320/DIG. 1
4,032,830 6/1977 Buonavita ........................ 363/25
4,330,816 5/1982 Imazeki et al. ..................... 363/56

FOREIGN PATENT DOCUMENTS 2171274 9/1973 France .
2332640 6/1977 France .
2349990 11/1977 France .
1227630 3/1971 United Kingdom ............... 320/39

OTHER PUBLICATIONS

PWM Battery Charger, 2420 Elektor, vol. 6 (1980), Jul./Aug.
Direct Line and Doubler Rectifier Assembly, J. R. Cielo and S. K. Rao, IBM Technical Disclosure Bulletin, vol. 14, No. 3, Aug. 1971.

Primary Examiner—Patrick R. Salce
Assistant Examiner—Anita M. Ault
Attorney, Agent, or Firm—Anibal Jose Cortina

[57] ABSTRACT

A power supply for charging a storage battery includes a switching pulse width modulator for controlling the current flowing from an input rectifier to an output transformer. The input rectifier is convertable from a full-wave bridge to a voltage doubler for operation at two different line voltages. A current limiting circuit and a charging voltage control circuit are both responsive to sensed output current to closely match the output of the power supply to the charging capacity of the battery. An overcurrent sensing circuit protects the power supply and battery against the results of line transients and shorted battery cells. A sensing circuit detects the absence of a battery, and an end-of-charge sensing circuit detects full charge voltage. A latching circuit disables the power supply on detection of overcurrent, absence of a battery, or full charge voltage.

16 Claims, 11 Drawing Figures

HIGH FREQUENCY SWITCHING BATTERY CHARGER

This application is a continuation of application Ser. No. 496,773 filed May 20, 1983, now abandoned.

This application relates to the field of electronic power supplies. In particular, this application relates to a novel battery charger for charging a storage battery.

BACKGROUND OF THE INVENTION

Power supplies for charging batteries are well-known, and numerous types have been constructed, and are commercially available. Such battery chargers are conventionally large, heavy and bulky devices, which provide a constant voltage, which is either manually applied to and removed from terminals of a storage battery, or timed with a timer which de-energizes the battery charger after a predetermined length of time. For charging a battery as quickly as possible, some such power supplies have been provided with a fragile temperature measuring means to be inserted into the electrolyte of a cell to measure its temperature, and disable the output of the battery charger to prevent temperature of the electrolyte from exceeding a predetermined value. Numerous other features have been incorporated in battery chargers, such as a variety of charging modes, including boost charges, trickle charges, charging with a sawtooth waveform, so-called "burp" circuits in which a short pulse of high voltage is applied in a direction opposite the direction of charging current to dislodge evolved gas bubbles, timer circuits for applying charging current in a predetermined pattern of voltage steps, and the like.

Battery chargers have been constructed using ferro-resonant transformers, adjustable air gap transformers, and leakage reactance transformers with an interruption or air gap in the magnetic circuit.

These prior battery chargers, in addition to being large and bulky, were not well-suited for charging a storage battery which was only partially discharged.

The disclosed battery charger overcomes these and other deficiencies of the prior art.

SUMMARY OF THE INVENTION

A battery charger according to the instant invention provides a light, powerful and compact assembly. In one embodiment of the invention, a battery charger with a 1.2 Kw output rating, and very quiet in operation, is contained in an enclosure measuring 6×9×12 inches (15×23×30 cm), which is fully protected against the effect of shorted batteries, line transients, incorrect connection, and is suitable for charging a partially discharged storage battery, and a wide range of battery sizes.

Accordingly, it is a primary object of the invention to provide a power supply for charging a storage battery, adaptable for receiving power from power supply means of more than one voltage, and having rectifying means operatively connected to the power supply, an output transformer means connected to the rectifying means and to the battery to be charged, and power switching means operatively connected to the input and output transformer means for controlling the flow of current through the output transformer. A pulse width modulator means is operatively connected to the power switching means for controlling the power switching means, and further including current sensing means for sensing the flow of current through the output transformer means. Current limiting means and charging voltage control means, both responsive to said current sensing means, are operatively connected to the pulse width modulator means for controlling it. Latch means are provided for stopping the pulse width modulator means, an overcurrent sensing means responsive to the current sensing means and means for sensing the absence or disconnection of the storage battery and end-of-charge sensing means are operatively connected to the latch means. The end-of-charge sensing means is responsive to a predetermined voltage present at a terminal of the battery being charged.

It is a feature of the invention that a battery charger which is small, high in capacity and light in weight may be easily constructed in accordance with the invention. It is an advantage of the invention that a conveniently portable battery charger for charging a storage battery which is depleted or at an intermediate state of charge is provided.

Other objectives, features and advantages of the invention will become apparent from the detailed description which follows.

DESCRIPTION OF THE PREFERRED EMBODIMENT

Figure 1:
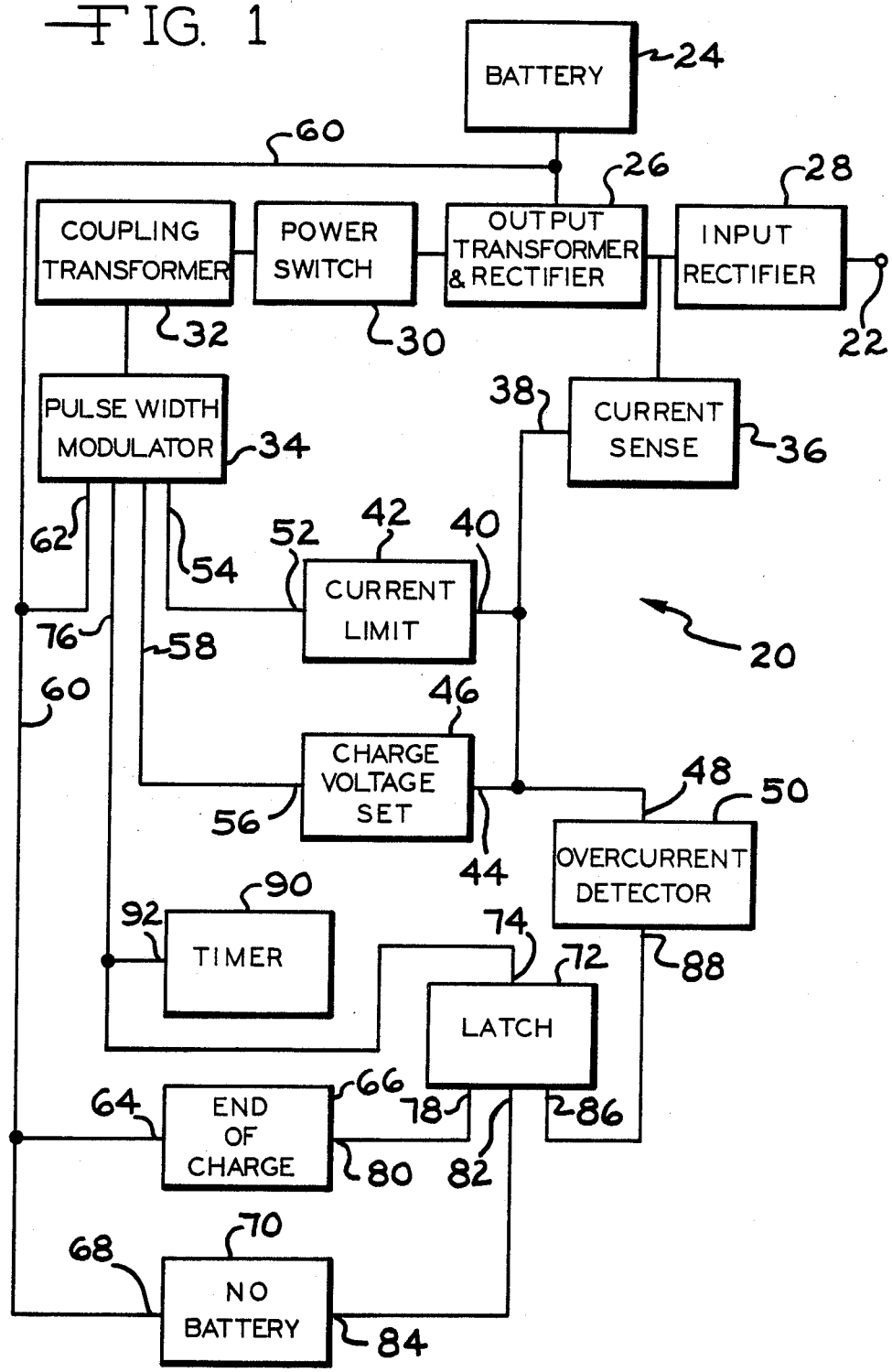
FIG. 1 is a block diagram of a preferred embodiment of the invention.
Figure 2:
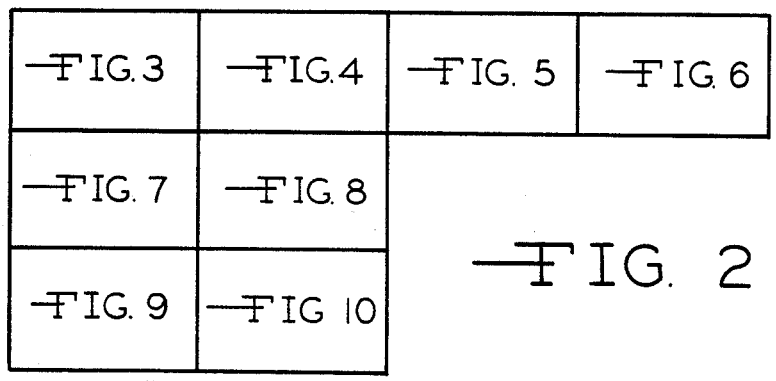
FIG. 2 is a diagram indicating the arrangement of FIGS. 3–10 to assemble a circuit diagram of the preferred embodiment of the invention.

It should be noted, in connection with this detailed description of the embodiment, that various individual items such as a battery being charged, appear on more than one sheet of drawings, for convenience in describing and understanding the circuit of the preferred embodiment, and that certain devices, such as transformers, may have a portion illustrated in one figure and the remainder illustrated in another figure. These instances will be noted in connection with the description which follows. Also, similar reference numerals will be used for similar features wherever possible.

FIG. 1 shows a block diagram of a preferred embodiment of the invention. A battery charger 20 includes power supply means 22, for connection to a source of power, for charging a storage battery 24. As will become apparent, storage batteries of different voltages, such as 12 volt and 24 volt batteries may be accommodated, and power supply means 22 may be connected to either a 120 volt or 220 volt source of electrical energy. An output power transformer and rectifier assembly 26 is connected both to an input rectifier means 28 and to a power switching means 30. Power switching means 30 controls the flow of current from the input rectifier means through the output transformer means, and thus controls the power delivered to storage battery 24. A coupling transformer means 32, interconnects power switch 30 with a pulse width modulator means 34. Pulse width modulator means is of conventional design, and may be conveniently implemented with an integrated circuit device which includes a pulse generator, a duty cycle control circuit, external inputs for controlling the duty cycle and for starting and stopping the pulse width modulator, external inputs for setting its frequency, dual alternating output switches, and a regulated low voltage power supply, known in the art as a regulating pulse width modulator. The pulse width modulator of the illustrated embodiment of the invention may be constructed with a type 1524, 2524, or 3524 regulating pulse width modulator available from several manufacturers. A current sensing means 36 is responsive to the current flowing through the input rectifier means 28 and the output transformer of means 26, and provides a proportional signal on line 38, which is connected to an input 40 of current limiting means 42, and to an input 44 of charge voltage setting means 46, and to an input 48 of an overcurrent detector means 50. Output 52 of current limit means 42 is connected to an input 54 of pulse width modulator means 34, and output 56 of charge voltage setting means 46 is connected to an input 58 of pulse width modulator means 34. A sensing connection is made to a terminal of battery 24 through line 60, which is connected to an input 62 of pulse width modulator 34, and input 64 of end-of-charge detecting means 66, and to an input 68 of a detector 70 for detecting the absence of a battery such as battery 24, to prevent application of voltage to unconnected output terminals.

A latching means 72 has an output 74 connected to an input 76 of pulse width modulator 34. Latching means 72 includes a first input 78 connected to output 80 of end-of-charge detecting means 66, a second input 82 connected to output 84 of detector 70, and a third input 86 connected to an output 88 of overcurrent detector means 50. Thus, pulse width modulator 34 may be stopped either by end-of-charge detector means 66, detector 70, or overcurrent detector means 50. A timer means 90 is preferably provided for stopping pulse width modulator 34 after a predetermined time, and having its output 92 either connected to input 76 of pulse width modulator 34, as shown, or connected to an input of latching means 74. Timer means 90 may be easily and conveniently implemented with a mechanical timer, or a counting timer of conventional design counting the cycles appearing at power supply means 22.

Figure 6:
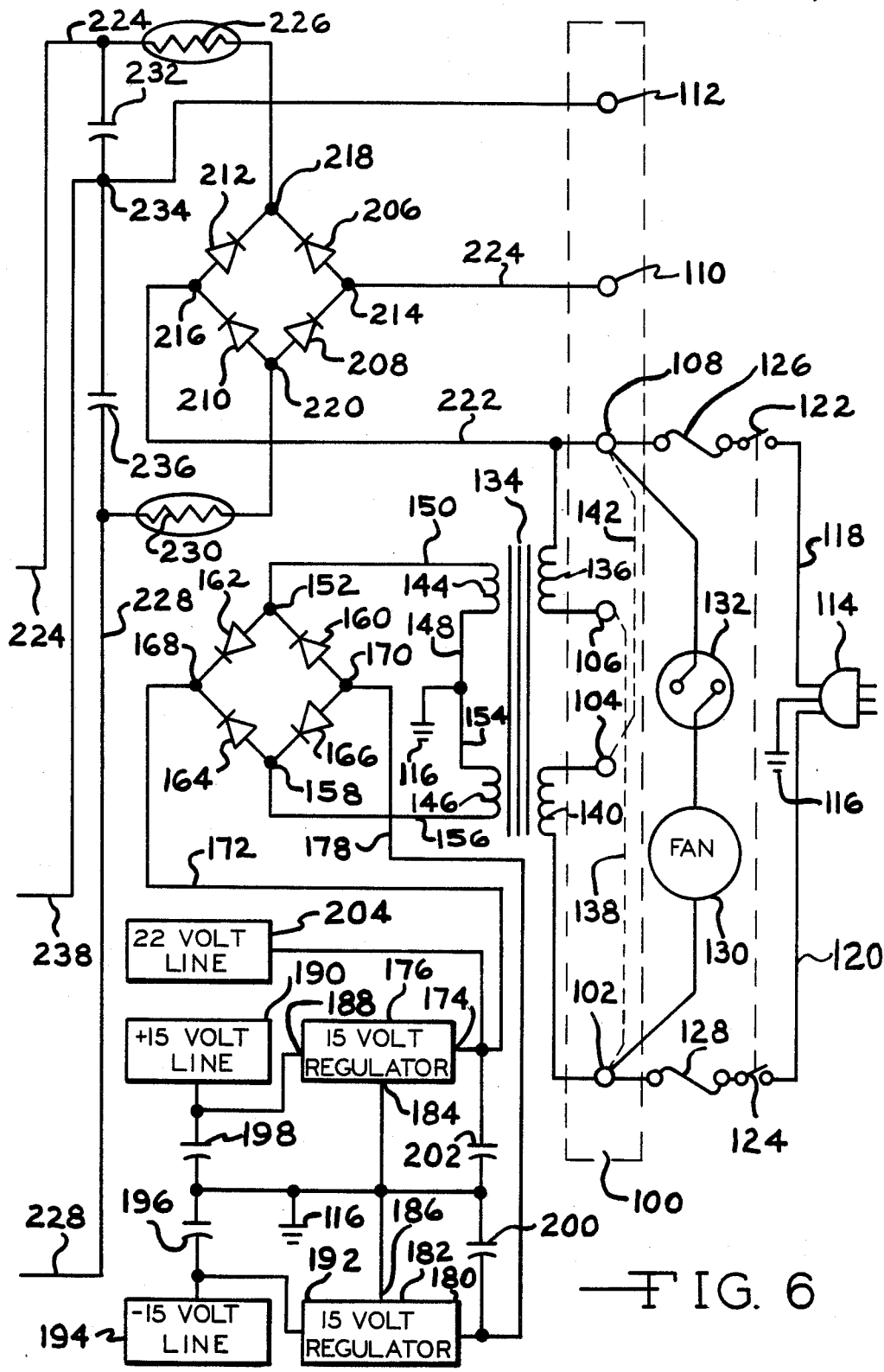

Referring first to FIG. 6, a terminal strip 100, provided with terminals 102, 104, 106, 108, 110 and 112 allows battery charger 20 to be connected for various line voltages. As shown, it is connected for a line voltage of approximately 120 volts, with input rectifier means according to the invention operating as a voltage doubler. The method of interconnection to adapt the disclosed embodiment of the invention for a higher line voltage will be apparent to one skilled in the art, and will result in input rectifier means according to the invention operating as a fullwave rectifier.

As shown, power supply means 22 includes a conventional three-prong plug 114, having a first terminal connected to ground 116, a second terminal connected to line 118 and a third terminal connected to line 120. An on-off switch is shown as having a first switch section 122 and a second switch section 124. Line 118 is connected through first switch section 122 and fuse 126 to terminal 108, while line 120 is connected through second switch section and fuse 128 to terminal 102. A fan 130 and a temperature-responsive switch means 132 are connected in series between terminals 102 and 108, so that fan 130 operates to cool battery charger 20 only when necessary. Switch means 132 may advantageously be mounted on a heat sink with other components, whose identity will be apparent to one skilled in the art from the description which follows, to direct cooling air to the heat sink only when necessary. A transformer 134 includes a first winding 136, connected between terminal 108 and terminal 106, terminal 106 being connected to terminal 102 through jumper 138, and a second primary winding 140, connected between terminals 102 and 104, with terminal 104 being joined to terminal 108 by jumper 142. Transformer 134 also includes first and second secondary windings 144 and 146. Winding 144 includes a first terminal 148 connected to junction 152. Second secondary winding 146 includes a first terminal 154 connected to ground 116 and a second terminal 156 connected to junction 158. A full wave rectifier, preferably an encapsulated full wave bridge assembly, composed of diodes 160, 162, 164 and 166 is connected between junctions 152 and 158, with the anode of diode 162 and cathode of diode 160 connected to junction 152, and the anode of diode 164 and cathode of diode 166 connected to junction 158. The cathodes of diodes 162 and 164 are connected to a junction 168, while the anodes of diodes 160 and 166 are connected to a junction 170. As illustrated, a positive voltage appears at junction 168, and a negative voltage appears at junction 170. Junction 168 is connected through line 172 to input 174 of a conventional integrated circuit positive 15 volt voltage regulator 176, and 170 is connected through line 178 to input 180 of a conventional integrated circuit negative 15 volt voltage regulator 182. The reference terminals 184 and 186 of regulators 176 and 182 are shown as connected to ground 116. Output 188 of regulator 176 is connected to 15 volt line 190, and output 192 of regulator 182 is connected to negative 15 volt line 194. A filter capacitor 196 is connected between line 194 and ground 116, and a filter capacitor 198 is connected between line 190 and ground 116. Filter capacitors 200 and 202 are connected between the respective inputs 174 and 180 of regulators 176 and 182 and ground 116. Line 172 is connected to 22 volt line 204, with filter capacitor 202 also serving to smooth the voltage appearing on line 204. Therefore, transformer 134 is a transformer which will supply approximately 22 volts through a full-wave bridge rectifier.

Input rectifier means according to the invention is shown as including rectifying diodes 206, 208, 210 and 212, preferably in the form of an encapsulated full-wave bridge assembly. The anode of diode 206 and cathode of diode 208 are connected to a junction 214, the anode of diode 212 and cathode of diode 210 are connected to a junction 216, the cathodes of diodes 206 and 212 are connected to a junction 218, and the anodes of diodes 208 and 210 are connected to a junction 220. Junction 216 is shown connected to terminal 108 by line 222, and junction 214 is shown connected to terminal 110 by line 224. Junction 218 is connected to line 224 through a resistor 226, and junction 220 is connected to line 228 through a resistor 230. Resistors 226 and 230 are preferably temperature-sensitive resistors, for limiting the inrush current which may occur when battery charger 20 is first energized by connecting to a power source or by operation of switch sections 122, 124. A capacitor 232 is connected between line 224 and point 234, and a capacitor 236 is connected between line 228 and point 234. As will be apparent, point 234 is a virtual ground point, and that capacitors 232 and 236 operate as voltage-doubling capacitors as well as filter capacitors in the interconnection shown. As shown, diodes 206 and 208 are inactive, current flowing only through diodes 210 and 212, charging capacitors 232 and 236 towards the respective peak voltages of each half cycle of line voltage applied to plug 114, so that twice the line voltage appears between lines 224 and 228.

As will be apparent, terminal strip 100 allows adapting battery charger 20 for a higher input voltage. To accomplish this, jumpers 138 and 142 would be removed, and a jumper, not shown, added between terminals 104 and 106. Another jumper, not shown, would be added between terminal 102 and terminal 110. Terminal 112 would be connected to ground 116, changing point 234 from a virtual ground to an actual ground. These changes serve to connect the rectifier composed of diodes 206, 208, 210, 212 as a full-wave bridge rectifier, rather than a voltage doubling rectifier, so that the same voltage appears between lines 224 and 228. Point 234 is connected to a line 238.

Figure 5:
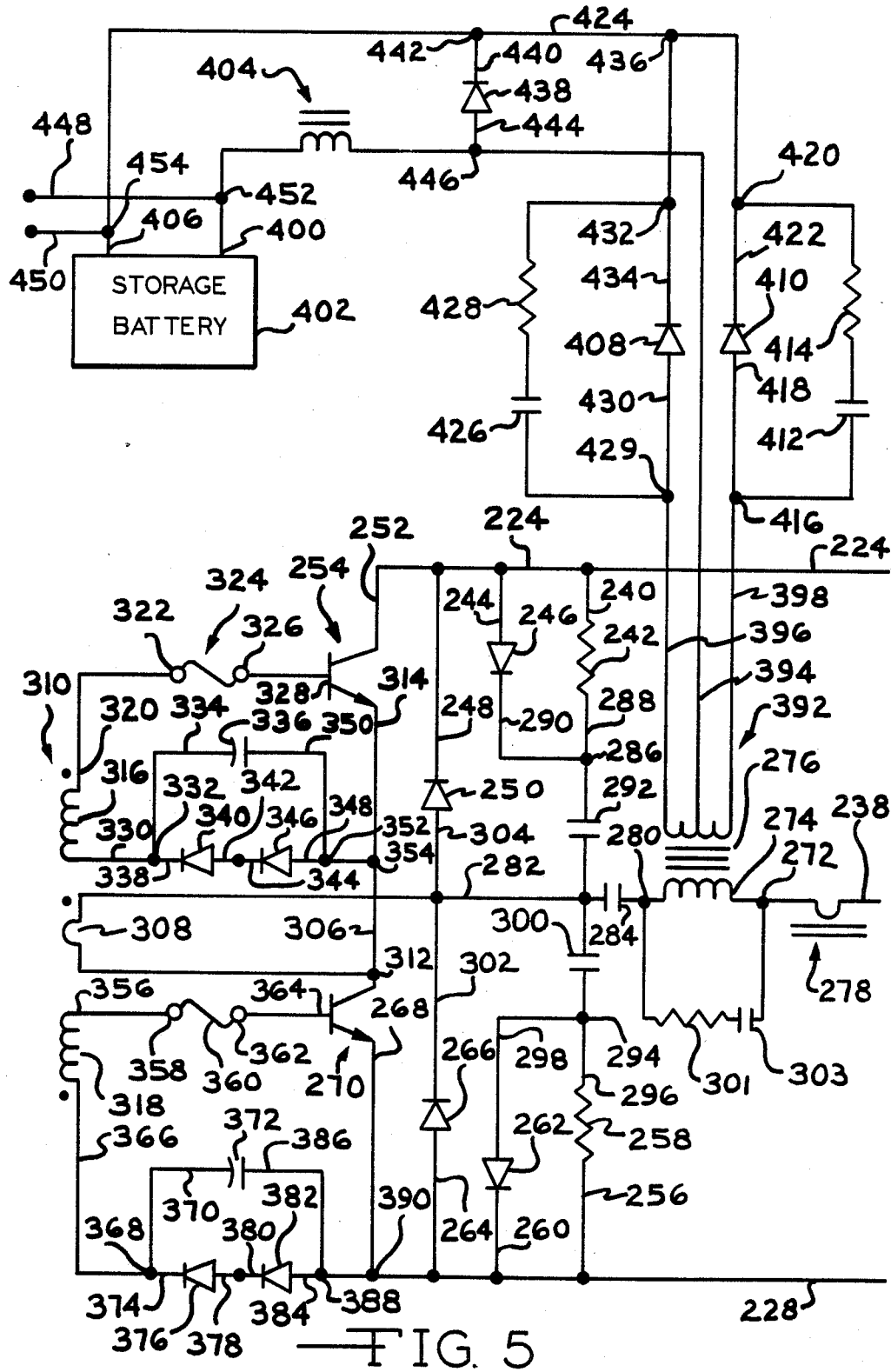

Turning now to FIG. 5, line 224 is shown connected to a first terminal 240 of a resistor 242, the anode terminal 244 of a diode 246, the cathode terminal 248 of a diode 250 and the collector terminal 252 of a power transistor 254. Line 228 is shown connected to a first terminal 256 of a resistor 258, the cathode terminal 260 of a diode 262 and the anode terminal 264 of a diode 266, and the emitter terminal 268 of a power transistor 270. Line 238 is connected to a terminal 272 of primary winding 274 of output transformer 276 through a current sensing means 278, preferably a toroidal transformer with its primary winding connected between line 238 and terminal 272. Current sensing means 278 also appears in FIG. 8, as an input to various current sensitive circuitry described below.

A second terminal 280 of primary winding 274 is connected to a line 282 through a blocking capacitor 284. Junction 286 between second terminal 288 of resistor 242 and cathode terminal 290 of diode 246 is connected to line 282 through a capacitor 292, and junction 294 between second terminal 296 of resistor 258 and anode terminal 298 of diode 262 is connected through capacitor 300 to line 282. A resistor 301 and capacitor 303 are connected in series between terminals 272 and 280. Resistors 242, 258, 301, diodes 246, 262 and capacitors 292, 300, 303 define buffer or snubber circuits. Cathode terminal 302 of diode 266 and anode terminal 304 of diode 250 are also connected to line 282. Diodes 250, 266 are free-wheeling diodes for transistors 254, 270.

Line 282 is connected to line 306 through a first secondary winding 308 of a coupling transformer 310. The primary winding and core of coupling transformer 310 are shown on FIG. 4. The purpose of winding 308 is to maintain line 306 electrically centered with respect to the operating ranges of transistors 254, 270. Collector terminal 312 of transistor 270 and emitter terminal 314 of transistor 254 are connected to line 306.

Second and third secondary windings 316 and 318 of transformer 310 respectively control transistors 254, 270. A first terminal 320 of winding 316 is connected to first terminal 322 of fuse 324. Second terminal 326 of fuse 324 is connected to base terminal 328 of transistor 254. Second terminal 330 of winding 316 is connected to junction 332 between first terminal 334 of capacitor 336 and cathode terminal 338 of diode 340. Anode terminal 342 of diode 340 is connected to cathode terminal 344 of a diode 346, which in turn has its anode terminal 348 connected to second terminal 350 of capacitor 336 at junction 352, which is connected to line 306 at junction 354. Capacitor 336 and diodes 340, 346 form a turn-off circuit. Although two diodes in series are illustrated, a single diode may be used if desired, depending on the charge voltage of switching capcitors 336, 372. Capacitors 336, 372 provide fast switching of transistors 254, 270.

Similarly, first terminal 356 of third secondary winding is connected to first terminal 358 of fuse 360. Second terminal 362 of fuse 360 is connected to base terminal 364 of transistor 270. Second terminal 366 of winding 318 is connected to junction 368 between first terminal 370 of capacitor 372 and cathode terminal 374 of diode 376. Anode terminal 378 of diode 376 is connected to cathode terminal 380 of diode 382, which has its anode terminal 384 connected to second terminal 386 of capacitor 372 at junction 388, which is joined to emitter terminal 268 of capacitor 270 at junction 390.

Transistors 254, 270 and their associated components constitute power switching means according to the invention.

Figure 7:
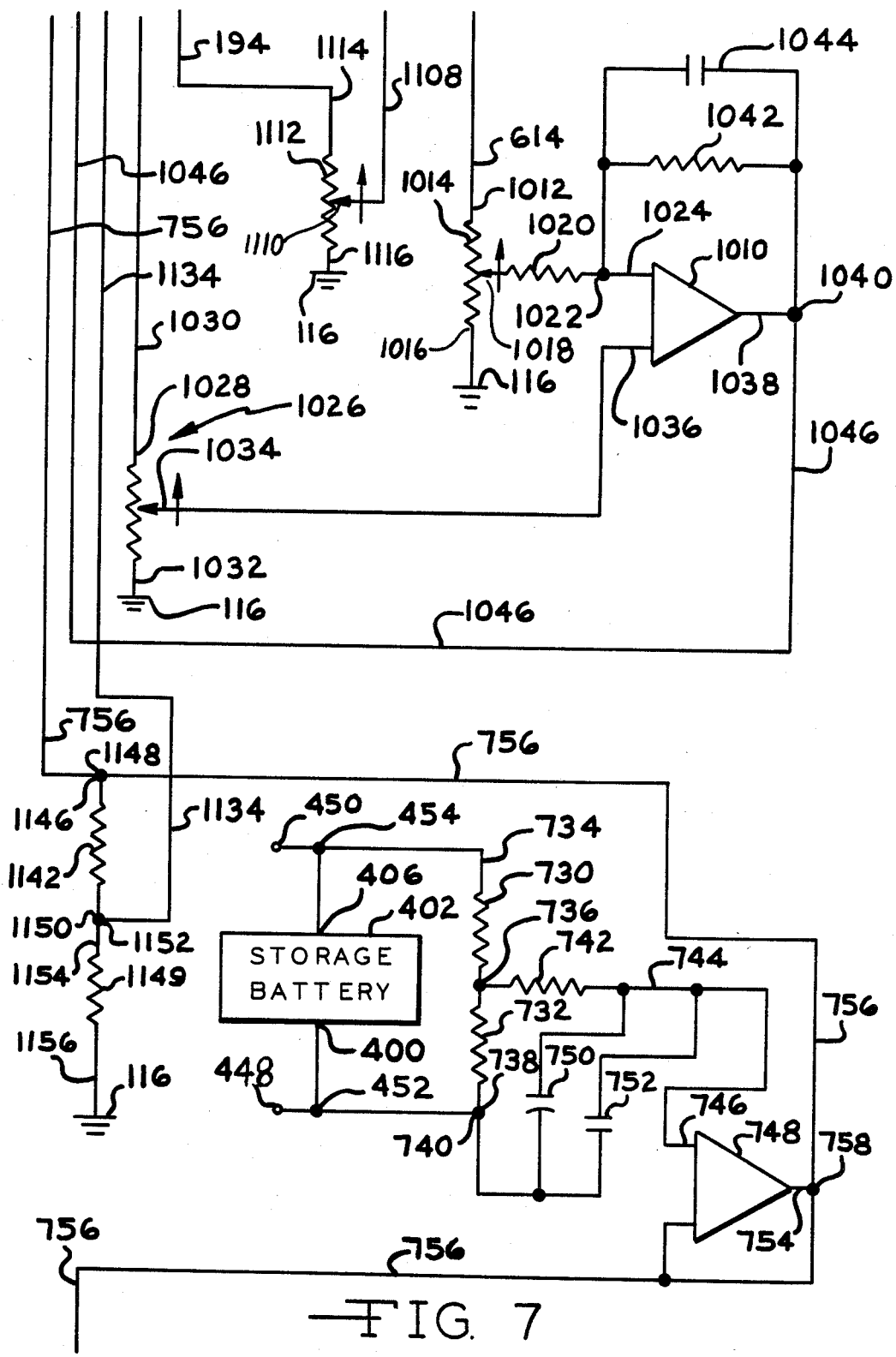

Output transformer 276 has a center-tapped secondary winding 392 having a first center-tapped terminal 384 and second and third terminals 396 and 398. Terminal 394 is connected to negative terminal 400 of battery 402 through a series inductor 404. Battery 402 is also shown in FIG. 7, in connection with the circuitry that senses its charge condition. Second terminal 396 of secondary winding 392 is connected to positive terminal 406 of battery 404 through a diode 408, and, similarly, third terminal 398 is connected to positive terminal 406 through a diode 410. Diodes 408, 410 serve to rectify the alternating voltage appearing at secondary winding 392. A snubber circuit composed of the series combination of a capacitor 412 and a resistor 414 is connected across diode 410, at junction 416 interconnecting terminal 398 and anode terminal 418 of diode 410, with its opposite end connected to junction 420 between cathode terminal 422 of diode 410 and line 424 leading to positive terminal 406. Similarly, a snubber circuit composed of capacitor 426 and resistor 428 has its first end connected to junction 429 between terminal 396 and anode terminal 430 of diode 408, and its opposite end connected to junction 432 between cathode terminal 434 of diode 408, and is in turn connected to line 424 at junction 436. A diode 438 has its cathode terminal 440 connected to line 424 at junction 442 and its cathode terminal 444 connected to terminal 394 at junction 446. Battery condition sensing lines 448, 450 are connected to positive and negative terminals 400, 406 at junctions 452, 454, respectively. Sensing lines 448, 450 also appear in FIG. 7.

The function of series inductor 404 is to limit peak current in switching transistors 254, 270 and to minimize ripple. In the preferred embodiment, inductor 404 averages the voltage over a 50 microsecond cycle so that 15 microsecond pulses will produce an output voltage of 12 volts, and limits the output voltage at very low currents, where, as will become apparent, very narrow pulses are produced.

Figure 4:
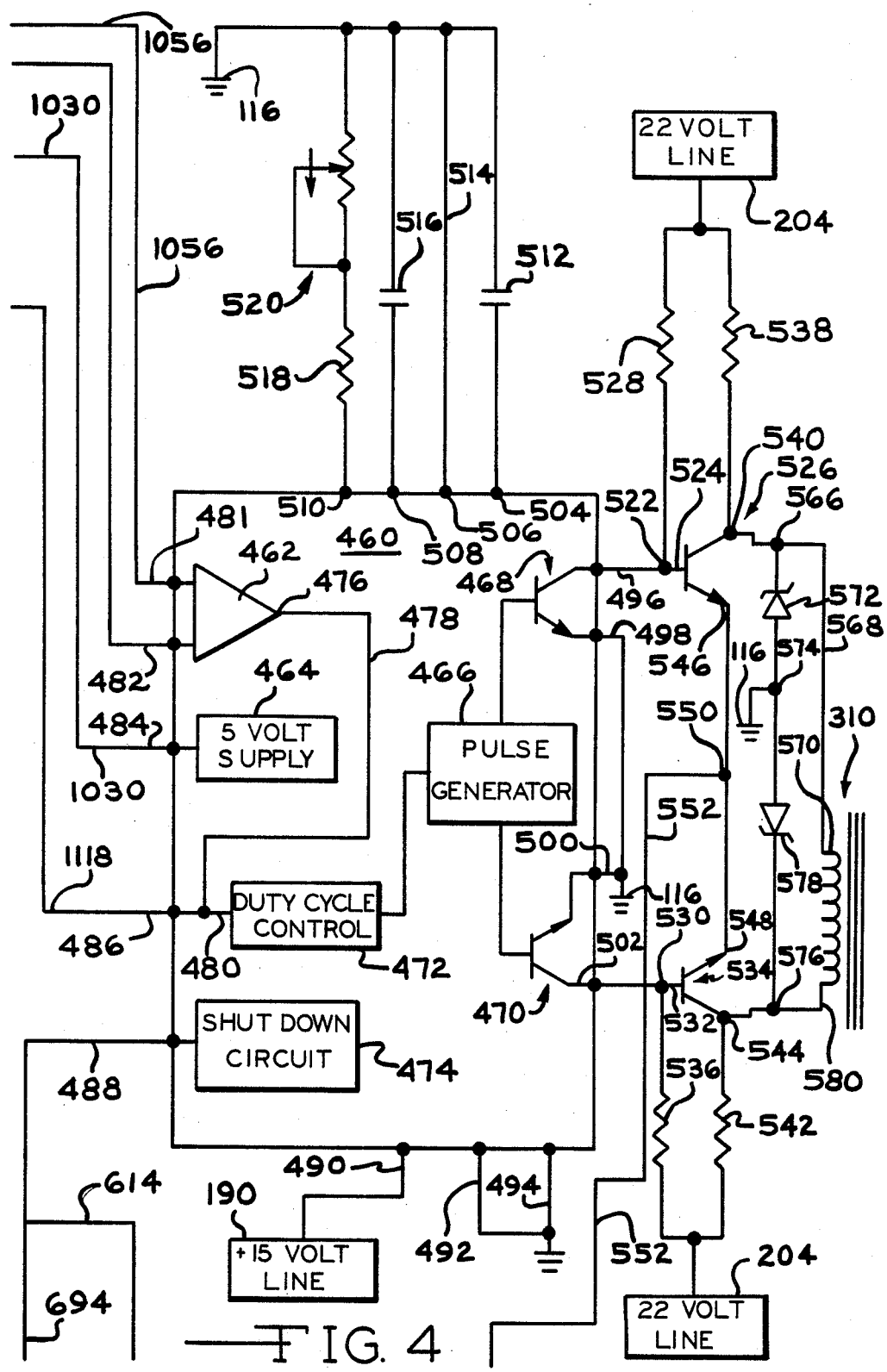

Turning now to FIG. 4, a conventional integrated circuit regulating pulse width modulator 460 includes an error amplifier 462, a 5 volt regulated supply 464, a pulse generator 466, output transistors 468 and 470, a duty cycle control 472 for controlling the duty cycle of pulse generator 466, and a shutdown circuit 474. The output 476 of error amplifier 462 is connected through a line 478 to input 480 of duty cycle control 472. Regulating pulse width modulator 460 includes first and second sensing terminals 481, 482, a 5 volt supply terminal 484, a duty cycle compensation input 486, a shutdown input 488, a power input 490, and current limit sensing inputs 492 and 494 which are not used in the illustrated embodiment of the invention. Regulated pulse width modulator 460 also includes a first collector output 496, a first emitter output 498, a second emitter output 500 and a second collector output 502. For pulse rate control and compensation, regulating pulse width modulator 460 also includes an output 504, internally connected to the output of an oscillator of pulse generator 466, a ground terminal 506, a capacitor input terminal 508 and a resistor input terminal 510 for setting the frequency of the oscillator of pulse generator 466. Output 504 is connected to ground 116 through a capacitor 512. Terminal 506 is connected to ground 116 through line 514. Terminal 508 is connected to ground through a frequency-setting capacitor 516, and terminal 510 is connected to ground 116 through the series combination of a fixed resistor 518 and a variable resistor 520. Adjusting resistor 520 or modifying the value of resistor 518 may be used to set the basic pulse rate produced by pulse width modulator 460.

Figure 8:
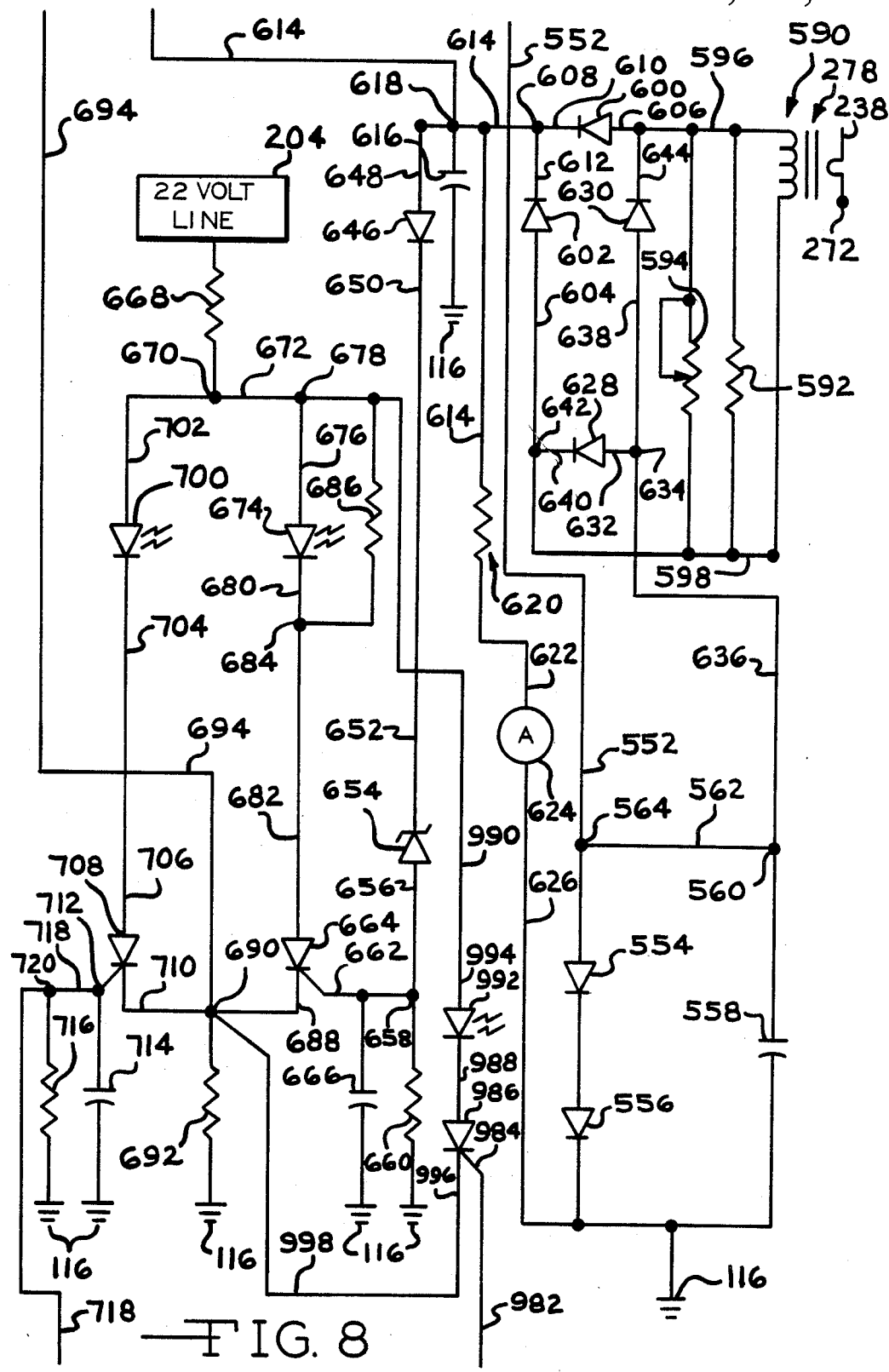

To amplify and transfer the alternating outputs of transistors 468, 470 to power switching transistors 254, 270, an output amplifier is provided. Outputs 498 and 500 are connected to ground 116. Output 496 is connected to junction 522 joining base terminal 524 of amplifying transistor 526 and a bias resistor 528 connected to 22 volt line 204. In like fashion, output 502 is connected to junction 530 joining base terminal 532 of amplifying transistor 534 and a bias resistor 536 connected to 22 volt line 204. A load resistor 538 connects 22 volt line 204 and collector terminal 540 of transistor 526, and a load resistor 542 joins 22 volt line 204 and collector terminal 544 of transistor 534. Emitter terminals 546, 548 are joined at junction 550 to line 552, which, as shown on FIG. 8, is connected to ground 116 through the series combination of diodes 554 and 556, which in turn are bypassed by a capacitor 558 connected between ground 116 and a junction 560. Junction 560 is joined by line 562 to a junction 564 connecting line 552 and diodes 554, 556. Diodes 554, 556 and capacitor 558 define a fast turn-off circuit for transistors 526, 534. Collector terminal 540 is joined to junction 566 between terminal 568 of primary winding 570 of transformer 310 and the cathode of zener diode 372. The anode of zener diode 572 is connected to ground 116 at junction 574. Similarly, terminal 544 is joined to junction 576 between the cathode of a zener diode 578 and second terminal 580 of primary winding 570 of transformer 310. Zener diode 578 has its anode joined to ground 116 at junction 574.

Turning now to FIG. 8, a voltage proportional to the current flowing between line 238 and terminal 272 through current-sensing means 278 appears as a voltage at secondary winding 590. A fixed resistor 592 and a variable resistor 594 are connected between first terminal 596 and second terminal 598 of winding 590 for adjusting the proportionality between the current sensed and the voltage appearing between terminals 596 and 598. The voltage appearing between lines 596 and 598 is rectified by a rectifier assembly composed of diodes 600, 602, 628 and 630. The anode terminal 604 of diode 602 is connected to line 598, and the anode terminal 606 of diode 600 is connected to line 596. The rectified voltage produced by diodes 600, 602, 628 and 630 is applied to junction 608 joining cathode terminal 610 of diode 600 and cathode terminal 612 of diode 602. Diodes 628 and 630 serve to complete a full-wave bridge with diodes 600 and 602. Diode 628 has an anode terminal 632 connected to junction 634, which is connected to junction 560 by line 636. Line 636 is also connected to anode terminal 638 of diode 630. The cathode terminal 640 of diode 628 is connected, at junction 642, to anode terminal 604 of diode 602, and cathode terminal 644 is connected to line 596 and to anode terminal 606 of diode 600. Thus, diodes 600, 602, 628 and 630 define a full-wave bridge with line 596 and junction 642 as input terminals, and junctions 608 and 634 as output terminals, with terminal 634 grounded, as will appear in greater detail below. The rectified voltage appears on line 614. A filter capacitor 616 is connected between line 614 and ground 116 at junction 618. A scaling resistor 620 is connected to line 614 and to first terminal 622 of indicating means 624. Second terminal 626 of indicating means 624 is connected to ground 116. Indicating means 624 is a volt meter calibrated as an ammeter, reducing the cost of battery charger 20 by avoiding the necessity for an ammeter shunt.

The series combination of a rectifying diode, zener diode and resistor is connected between line 614 and ground 116, for detecting an overcurrent condition of battery charger 20 and stopping its output by stopping pulse width modulator 460. Diode 646 has its anode terminal 648 connected to line 614, and its cathode terminal 650 joined to the cathode terminal 652 of zener diode 654. The anode terminal 656 of zener diode 654 is connected to junction 658, and a resistor 660 is interposed between junction 658 and ground 116. As will be apparent, if voltage appearing between terminals 596 and 598 is excessive, current will flow through diode 646 and 654, and develop a voltage at junction 658. Junction 658 is connected to a gate terminal 662 of a switch means shown as SCR 664. A capacitor 666 is interposed between gate terminal 662 and ground 116 for transient suppressing purposes. To give a visible indication of an overcurrent situation, which may be caused by a shorted battery, shorted connecting leads, line voltage transients, and the like, an indicating means shown as a light emitting diode is provided. A resistor 668 is interposed between 22 volt line 204 and a junction 670 joined to line 672. A light emitting diode 674 has its anode terminal 676 connected to line 672 at junction 678, and its cathode 680 connected to anode terminal 682 of SCR 664 at junction 684. Light emitting diode 674 may bypass a resistor 686 connected between junction 678 and 684 to provide adequate current flow through SCR 664 to maintain it conductive once it has been triggered, if necessary. Cathode terminal 688 of SCR 664 is connected, at junction 690, to a resistor 692 connected to ground 116 and to a line 694 connected to input 488 of pulse width modulator 460. Thus, excessive current detected by current sensing means 278 will cause SCR 664 to be triggered, illuminating light emitting diode 674 and energizing line 694 to stop pulse width modulator 460 and de-energize the output of battery charger 20.

A second light emitting diode 700 has its anode terminal 702 connected to junction 670, and its cathode terminal 704 connected to anode terminal 706 of a switch means shown as SCR 708. SCR 708 has its cathode terminal 710 connected to junction 690, and its gate terminal 712 connected to the parallel combination of capacitor 714 and resistor 716 connected between terminal 712 and ground 116. As illustrated, terminal 712 is joined to a line 718, and resistor 716 is joined to line 718 at junction 720. Thus, voltage appearing on line 718 will trigger SCR 708, illuminating light emitting diode 700, and applying a voltage to line 694 to stop pulse width modulator 460. As will become apparent, voltage will be applied to this line if a battery has not reached an 80 percent charge level after 12 hours of charging.

First and second switch means shown as SCR 664 and SCR 708 and their associated components are part of the latch means according to the invention, and light emitting diodes 674 and 700 serve as means for indicating that the pulse width modulator 460 has been stopped.

Turning now to FIG. 7, it may be seen that storage battery 402, also shown in FIG. 5, is connected to a voltage divider and buffer operational amplifier which provides a voltage proportional to a predetermined fraction of the voltage of storage battery 402. In the preferred embodiment, this fraction is equal to the voltage of three cells of storage battery 402. As illustrated, battery 402 is connected across a voltage divider network composed of resistors 730 and 732. As illustrated, a first end 734 of resistor 730 is connected to junction 454, and a second end of resistor 730 is connected to junction 736. A first end 738 of resistor 732 is connected to junction 452 at junction 740, and the second end of resistor 732 is connected to junction 736. A resistor 742 is connected in series between junction 736 and line 744, which is in turn connected to input 746 of operational amplifier 748. Filtering or suppressing capacitors 750 and 752 are connected in parallel between line 744 and junction 740. The voltage appearing at output 754 of operational amplifier 748 is applied to line 756 at junction 758. The use of such a buffer circuit is preferred, but is not necessary to practice the invention.

Figure 9:
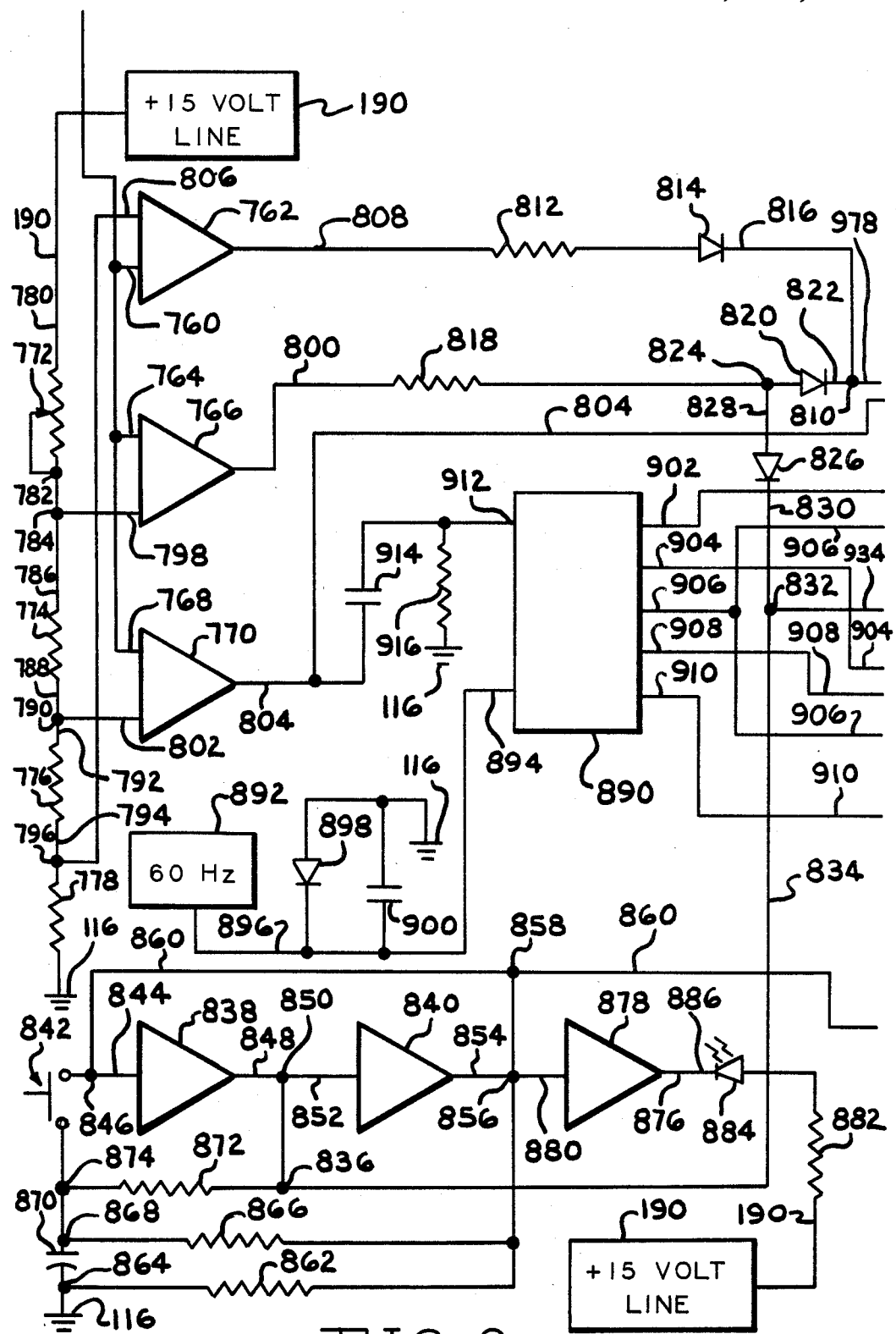

The voltage appearing on line 756 performs five functions, three of which are shown in FIG. 9. Line 756 is connected to input 760 of a comparator 762, an input 764 of a comparator 766 and an input 768 of a comparator 770. As will become apparent, comparator 762 detects the absence of a storage battery or the presence of an unchargeable battery, comparator 766 detects the completion of charge, and comparator 770 provides a signal when storage battery 402 is at least 80 percent fully charged. These conditions are detected by comparison with reference voltages provided by a voltage divider chain composed of resistors 772, 774, 776 and 778. Preferably, resistor 772 is a variable resistor having its first end 780 connected to 15 volt line 190, and its second end 782 connected to junction 784. Resistor 774 has its first end 786 connected to junction 784, and its second end 788 connected to junction 790. Resistor 776 has its first end 792 connected to junction 790, and its second end 794 connected to junction 796. Resistor 778 is connected between junction 796 and ground 116. Junction 784 is connected to input 798 of comparator 766, so that comparator 766 provides a signal on output line 800 when the voltage across storage battery 402 is equivalent to that of a fully-charged storage battery. Junction 790 is connected to input 802 of comparator 770, so that a signal is provided on output line 804 when the voltage across storage battery 402 is equivalent to that of a storage battery having 80 percent charge. Junction 796 is connected to input 806 of comparator 762, so that a signal is provided on output line 808 when there is no storage battery connected to the preferred embodiment of the invention. A signal will also be provided when there is very low cell voltage, approximately 1.85 volts or less per cell of storage battery 402, indicating that it is defective or "sulfated" to the extent that it cannot be conventionally charged. As will become apparent, the signals appearing on output lines 800, 804 and 808 operate to latchingly stop the operation of the preferred embodiment of the invention.

Figure 10:
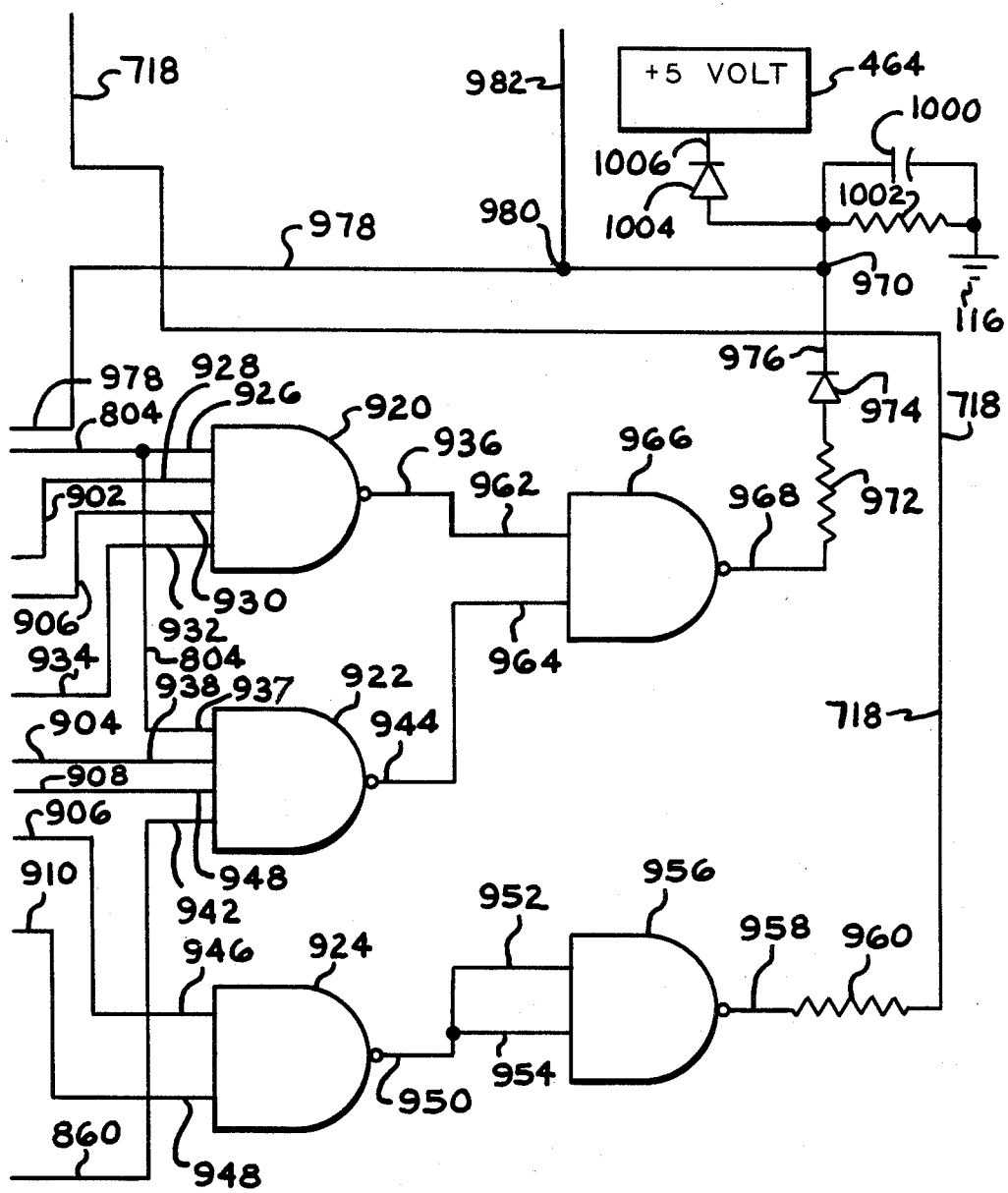

Timer means according to the preferred embodiment of the invention are illustrated on FIGS. 9 and 10, and partially in FIG. 8. As will appear more fully below, timer means according to the preferred embodiment of the invention include a three hour timer, a six hour timer and a twelve hour timer. Normally, the charging of a new, good battery will never be determined by timer means according to the invention. As illustrated, when a storage battery 402 charges to 80 percent of its full charge level, a signal is provided on line 804, and charging continues for three additional hours. A six hour timer is provided for use where it is desirable to overcharge storage battery 402 to neutralize possible stratification of acid or sulfation of plates, known as equalizing the battery. The twelve hour timer is provided to discontinue charging of a very old battery which never reaches the 80 percent charge level.

In FIG. 9, output line 808 is connected to junction 810 through the series combination of a resistor 812 and diode 814. The cathode terminal 816 of diode 814 is shown connected to junction 810, to illustrate the direction of current flow. Diode 814 and two other diodes described below are unnecessary to the preferred embodiment of the invention, but are provided for isolation purposes, so that, for test purposes, it may be determined which of several signals is responsible for stopping pulse width modulator 460. Output line 800 is also connected to junction 810 through the series combination of a resistor 818 and diode 820, having its cathode terminal 822 connected to junction 810. A junction 824 is interposed between resistor 818 and diode 820. A diode 826 has its anode terminal 828 connected to junction 824, and its cathode terminal 830 connected to junction 832. A line 834 joins junction 832 and a junction 836. As will become apparent, line 834 carries a signal from a flip-flop circuit composed of inverting buffers 838 and 840 responsive to push button switch 842, which is manually activated when it is desired to attempt to charge a battery for six hours past the 80 percent charge level. As illustrated, inverting buffer 838 has an input 844 joined to junction 846 and an output 848 joined to junction 850. Inverting buffer 840 has an input 852 joined to junction 850 and an output 854 joined to junction 856. Junction 856 is joined to junction 858 in a line 860 which serves in part to interconnect junctions 846 and 858. Junction 856 is connected through series resistor 862 to ground 116 through junction 864. A resistor 866 extends between junction 856 and a junction 868. A capacitor 870 is interposed between junction 864 and 868. A resistor 872 is interposed between junction 836 and junction 874, which is directly connected to junction 868. Switch 842 is interposed between junction 874 and junction 846. As can be seen, a low signal level initially exists at junction 846, and the six hour timer is disabled. A high signal level exists at junction 850, and a low signal level exists at junction 856. Junctions 846 and 856 being joined by line 860, this condition is stable. The high voltage appearing at junction 850 also appears at junction 874, so that when switch 842 is closed, a high voltage appears at junction 846, a low voltage appears at junction 850 and a high voltage appears at junction 856. Since junction 846 and 856 are interconnected, this condition remains after switch 842 is again opened, applying a high voltage signal to line 860. If switch 842 is again closed, this situation will reverse, as the low voltage at junction 850 is applied to input 844. Subsequent operations of switch 842 will cause the voltae on line 860 to alternate between high and low voltage levels. As will be apparent, lines 834 and 860 carry signals which may override and disable the three hour timer of the timer means according to the preferred embodiment of the invention, and enable the six hour timer.

When a high voltage exists at junction 856, output 876 of an inverting buffer 878 having its input 880 connected to junction 856 will have a low voltage level. Thus, current will flow from line 190 through the series combination of a resistor 882 and a light emitting diode 884 having its cathode terminal 886 connected to output 876, illuminating diode 884.

Timer means according to the preferred embodiment of the invention includes a conventional, commercially-available 24 stage frequency divider 890, preferably of the type that has outputs from only its last seven stages. A 60 Hz signal source 892 is provided, such as from junction 152 or 158, as shown in FIG. 6, and applied to a signal input 894 of divider 890. Suitable current limiting resistors, not shown, may be interposed between signal source 892 and input 894. This signal, carried by line 896, is rectified and bypassed to ground 116 by the parallel combination of a diode 898 and a capacitor 900. As will be apparent to one skilled in the art, a higher-frequency signal may also be applied simultaneously to input 894 to change the times determined by timer means of the preferred embodiment of the invention without any further circuit changes, and that a full-wave bridge may be used in place of diode 898 to double the frequency applied to input 894. As illustrated, divider 890 provides a signal on line 902 which first assumes a high voltage level 0.6 hours after a 60 Hz signal is first applied to input 894. Line 904 assumes a high voltage level after 1.2 hours, a line 906 assumes a high voltage level after 2.4 hours, a line 908 assumes a high voltage level after 4.8 hours, and a line 910 assumes a high voltage level after 9.6 hours. Divider 890 has a reset input 912 connected to line 804 through a capacitor 914 and bypassed to ground 116 by a resistor 916. Thus, when a signal appears on terminal 984 indicating that a storage battery such as battery 402 has charged to 80 percent of the full-charge level of a new battery, the divider 890 will be reset by a reset pulse, and will begin timing anew. As will become further apparent below, the preferred embodiment of the invention provides a constant-current level until the battery being charged has reached an 80 percent charge level, and then begins controlling the current applied.

The signals from lines 902, 904, 906, 908 and 910 are processed into three, six and twelve hour signals by NAND gates 920, 922 and 924. NAND gate 920 has a first input 926 connected to line 804, a second input 928 connected to line 902, a third input 930 connected to line 906, and a fourth input 932 connected to junction 832 through line 934. Thus, a low voltage level signal will appear at output 936 of NAND gate 920 for stopping modulator 460 after divider 890 has been operating for the sum of 0.6 hours and 2.4 hours, the battery being charged has reached an 80 percent charge level, and a high voltage is provided at junction 836 in FIG. 9, indicating that switch 842 has not been operated. NAND gate 922 includes a first input 937 connected to line 804, a second input 938 connected to line 904, a third input 948 connected to line 908 and a fourth input 942 connected to line 860. Thus, a low voltage signal for stopping modulator 460 will be provided at output 944 of gate 922 when divider 890 has been operated for the sum of 1.2 hours and 4.8 hours, comparator 966 has detected an end-of-charge condition and switch 842 has been depressed. NAND gate 924 has a first input 946 connected to line 906 and a second input 948 connected to line 910. Thus, a low voltage signal will appear at output 950 of gate 924 when divider 890 has been operating for the sum of 2.4 and 9.6 hours. The signal appearing at output 950 is shown applied to inputs 952 and 954 of a NAND gate 956, serving as an inverter, causing a high voltage signal level to appear at its output 958. This signal is applied to line 718 through series resistor 960, causing switch means shown as SCR 708, shown in FIG. 8, to become conductive, illuminating light emitting diode 700 and applying a signal to line 694 to stop modulator 460.

The signals appearing at outputs 936 and 944 of respective gates 920, 922 are applied to first and second inputs 962 and 964 of a NAND gate 966, serving as an OR gate. Presence of this signal at either input 962 or 964 will cause a high voltage level signal to appear at output 968 of gate 966, which is applied to junction 970 through the series combination of a resistor 972 and diode 974, having its cathode terminal 976 connected to junction 970. This diode may also be eliminated, if desired, since its primary function is isolation for test purposes. Junction 970 is joined to junction 810, shown in FIG. 9 by a line 978, and includes a junction 980 connected through line 982 to the input terminal 984 of a switch means shown as SCR 986, shown in FIG. 8. The anode terminal 988 of SCR 986 is connected to junction 678 through a line 990 and a light emitting diode 992 having its anode terminal 994 connected to line 990. SCR 986 has its cathode terminal 996 connected through a line 998 to junction 690. Thus, a signal applied to line 982 will cause SCR 986 to become conductive, illuminating light emitting diode 992, and applying a signal to line 694 to stop modulator 460.

The signal appearing on line 982, electrically connected to junction 970, is bypassed to ground 116 through the parallel combination of a capacitor 1000 and a resistor 1002, and also connected to 5 volts supply 464 of modulator 460, shown in FIG. 4 through a diode 1004 having its cathode terminal 1006 connected to 5 volt supply 464.

Figure 3:
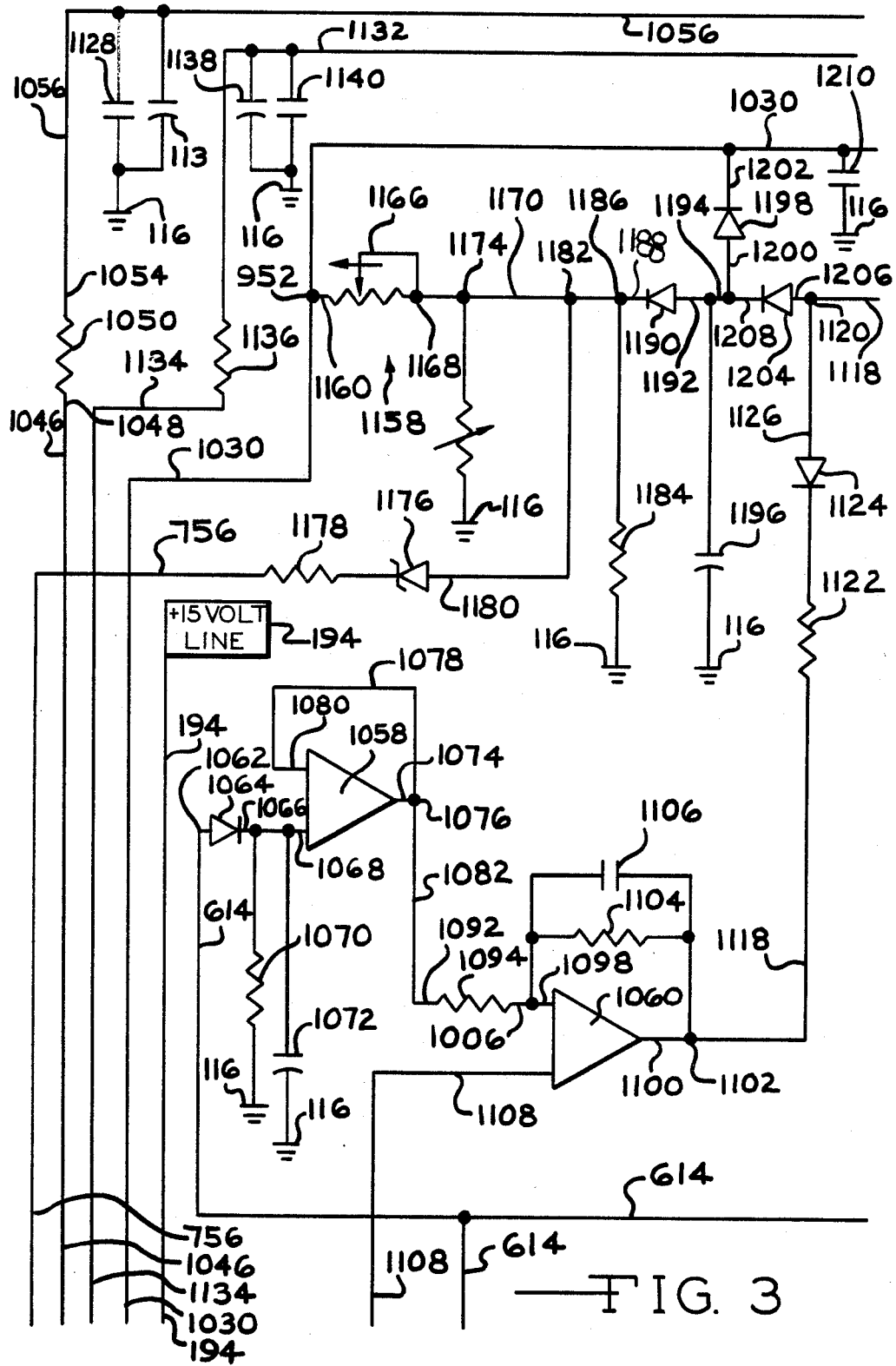
FIGS. 3–10 are each illustrations of a portion of the circuit diagram of the preferred embodiment of the invention.

Turning now to FIGS. 3 and 7, an amplifier 1010 and its associated circuitry serves as charging voltage control means responsive to current sensing means 278 according to the invention. Line 614, carrying a current responsive signal, is connected to a first terminal 1012 of a potentiometer 1014, having its second terminal 1016 connected to ground 116. Movable contact 1018 of potentiometer 1014 is connected through a resistor 1020 to junction 1022. Junction 1022 is connected to inverting input 1024 of amplifier 1010. A potentiometer 1026 has a first terminal 1028 connected to line 1030, connecting it to 5 volt supply 464 at output 484 of pulse width modulator means 460, and a second terminal 1032 connected to ground 116. Its movable contact 1034 is directly connected to noninverting input 1036 of amplifier 1010.

Amplifier 1010 has an output terminal 1038 connected to junction 1040. The parallel combination of a resistor 1042 and an integrating or bypass capacitor 1044 is connected between output terminal 1038 and inverting input terminal 1024 of amplifier 1010. A line 1046, connected to junction 1040, is connected to a first terminal 1048 of a resistor 1050 which has its second terminal 1054 connected through a line 1056 to input 481 of pulse width modulator means 460, for in part controlling its duty cycle. Potentiometer 1014, together with resistors 1020 and 1042, set the gain of amplifier 1010 responsive to the current sensed, and potentiometer 1026 is a charge voltage setting control.

FIG. 3 shows various circuitry including current limiting means according to the invention, and deadband control circuitry for insuring that output transistors 468 and 470 of pulse width modulating means 460 are not conductive simultaneously.

The active components of current limiting means according to the invention are amplifiers 1058 and 1060. As illustrated, line 614, carrying a current-responsive signal, is connected to anode terminal 1062 of rectifying diode 1064, and its cathode terminal 1066 is connected to inverting input 1068 of amplifier 1058. The parallel combination of a resistor 1070 and capacitor 1072 is connected between inverting input 1068 and ground 116. Amplifier 1058 has an output terminal 1074 connected to junction 1076. A line 1078 interconnects junction 1076 and noninverting input 1080 of amplifier 1058. A line 1082 interconnects junction 1076 and a first terminal 1092 of a resistor 1094, having a second terminal 1096 connected to inverting input 1098 of amplifier 1060. Amplifier 1060 includes an output terminal 1100 connected to junction 1102. A parallel combination of a resistor 1104 and capacitor 1106 is connected between junction 1102 and inverting input 1098. Noninverting input 1108 of amplifier 1060 is connected to movable contact 1110 of potentiometer 1112. First terminal 1114 of potentiometer 1112 is connected to 15 volt line 194, and second terminal 1116 is connected to ground 116. Potentiometer 1112 serves to set a predetermined current limit. Junction 1102 is connected to a line 1118, through a junction 1120, to input 486 of pulse width modulator means 460, and serves to limit the current supplied to battery 402 by narrowing the pulses produced by pulse generator 466 of pulse width modulator 460.

A series combination of a resistor 1122 and a rectifying diode 1124 is interposed in line 1118 between junction 1102 and 1120, with diode 1124 oriented so that its anode terminal 1126 is in nonrectifying electrical connection with junction 1120.

Line 1056 is shown filtered by the parallel combination of capacitors 1128 and 1130, and a line 1132, joined to line 1134 through a resistor 1136 and connected to input 482 of pulse width modulator means 460 which is filtered by the parallel combination of capacitors 1138 and 1140. Capacitors 1128, 1130, 1138 and 1140 serve to filter the signals appearing on the respective lines to which they are attached to ground 116. The technique of using two paralleled capacitors for filtering is well-known. A large value capacitor is capable of passing low-frequency components, but has large inherent inductance, making it unsuitable for passing high frequency components. Thus, a paralleling low-value capacitor is used to pass high frequency components of a signal such as a noise signal.

A voltage divider composed of resistors 1142 and 1149 divides the three-cell voltage appearing on line 756 by, in the illustrated preferred embodiment of the invention, a factor of three, and applies this divided voltage to line 1134, for relating the charging voltage applied to storage battery 402 with its state of charge. Resistor 1142 has its first terminal 1146 connected to junction 1148 in line 756, and its second terminal 1150 connected to junction 1152, which is connected to line 1134. Resistor 1149 has its first terminal 1154 connected to junction 1152, and its second terminal 1156 connected to ground 116.

The remaining components are dead band control circuitry, filtering circuitry, rectifying, limiting and threshold-sensitive circuitry.

A potentiometer 1158 serves to adjust the dead band so that output transistors 468, 470 of pulse width modulator means 460 are not simultaneously conductive. First terminal 1160 of potentiometer 1158 is connected to line 1030 at junction 952, and second terminal 1164 and movable contact 1166 are joined together at junction 1168, and thus connected to line 1170. A variable temperature-sensitive resistor 1172, preferably mounted on a transistor heat sink, is connected between ground 116 and a junction 1174 in line 1170, to insure that the pulse width and resultant output power is reduced if the heat sink, and the transistors mounted to it, become too hot.

A zener diode 1176 and resistor 1178 are interposed between line 756 and line 1170. Zener diode 1176 is oriented so that its anode terminal 1180 is in nonrectifying electrical connection with junction 1182 in line 1170. Diode 1176 is chosen so that a higher voltage level signal will be applied to line 1170 when battery 402 approaches full charge, to increase the duty cycle of pulse generator 466 of pulse rate modulator 460 to increase the output voltage to the battery, particularly at low line voltage.

A resistor 1184 interconnects a junction 1186 in line 1170 and ground 116. The cathode terminal 1188 of a rectifying diode 1190 is connected to junction 1186, and its anode terminal 1192 is connected to a line 1194. A capacitor 1196 interconnects line 1194 and ground 116. A clamping diode 1198 has its anode terminal 1200 connected to line 1194, and its cathode terminal 1202 connected to line 1030. This assures that the voltage on line 1194 cannot exceed the voltage on line 1030. A diode 1204 is connected between line 1194 and line 1118, and has its anode terminal 1206 connected to junction 1120, and its cathode terminal 1208 connected to line 1194. A capacitor 1210 is connected between line 1030 and ground 116.

Thus, as will be apparent, the voltage on line 1118 is driven to a more negative value to decrease the duty cycle of pulse generator 466 of pulse width modulator 460 to limit the current, current limiting also increasing the dead band. The components of dead band control and charging voltage control are linked in a loop, since amplifier 1010 and potentiometer 1158 both receive their input from voltage appearing on line 1030. A high voltage appearing on line 756, sufficient to pass through zener diode 1176, will be applied to line 1030 through potentiometer 1158, which thus limits the voltage applied to line 1030 to prevent "overlap" in the conductive times of transistors 468, 470 of pulse width modulator means 460.

Figure 11:
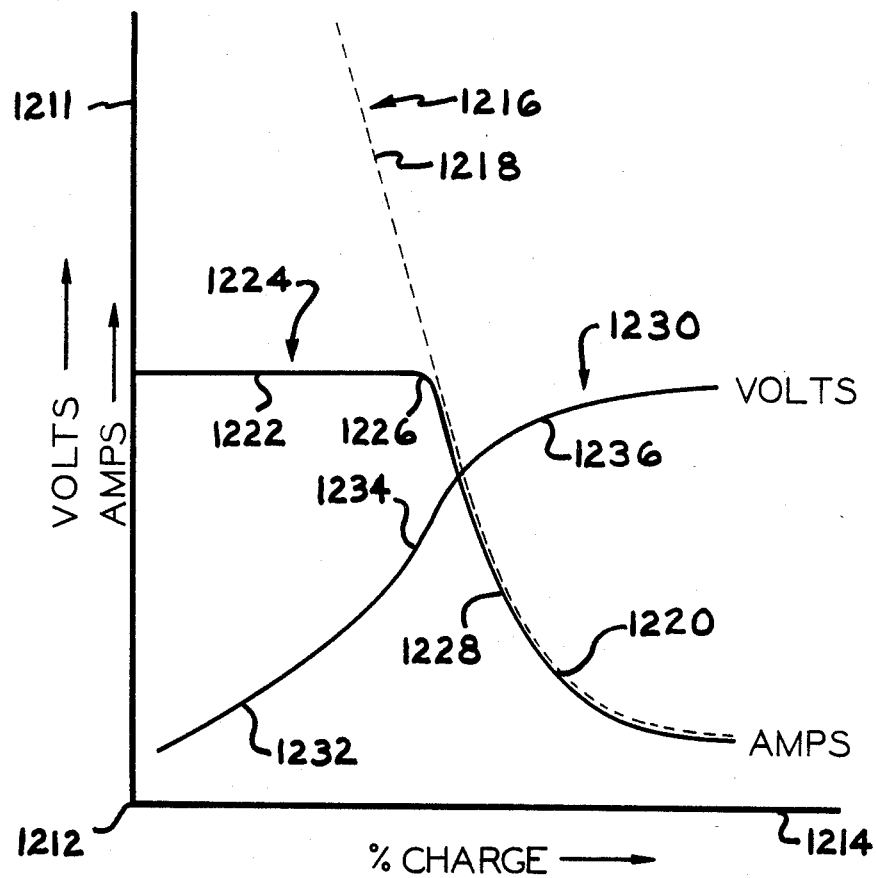
FIG. 11 is a charging curve showing the relation between the amperage and voltage output of the preferred embodiment of the invention to percentage charge of a storage battery.

The characteristics resulting from the functions preformed by the disclosed circuitry are illustrated in FIG. 11, interrelating percentage charge of battery 402 and voltage and ampere output of battery charger 20. The graph of FIG. 11 shows increasing voltage or amperage on axis 1211 from origin 1212, and increasing percentage of charge is shown with respect to axis 1214, perpendicular to axis 1210, from origin 1212. As illustrated by broken line curve 1216, the current a battery will accept may be quite high in the case of a fully discharged battery, and decreases initially in a generally linear manner as shown by portion 1218 of curve 1216, and then in an asymptotic manner to a final value as shown by portion 1220 of curve 1216. The output of battery charger 20 is shown as a solid line. The maximum output of battery charger 20 is limited by the size of the components, particularly those of transistors 254, 270, so that the output of battery charger 20 is a constant value as shown by horizontal portion 1222 of current output curve 1224, until the percentage charge of the battery being charged is such that the current which can be accepted by the battery equals the current which can be provided by battery charger 20. This point is indicated by reference numeral 1226, and is preferably the 80 percent charge level of the battery being charged. Thereafter, in portion 1228 of curve 1224, the current output of battery charger 20 tracks the current acceptance of the storage battery being charged. The output voltage curve 1230 includes a generally linearly increasing portion 1232 when the percentage charge of the battery is low, a sharply increasing portion 1234 when the percentage charge of the battery is at an intermediate value, and an asymptotic decreasing portion 1236 as the battery being charged approaches full charge. This characteristic of the disclosed circuitry is quite advantageous, since it matches the energy output of the battery charger 20 to the energy acceptance characteristic of the plates of a storage battery such as battery 402. As is known, when battery plates or electrodes are substantially fully discharged, they will accept very little energy without becoming too warm. However, when they are partly charged, their conductivity increases so that significantly higher energy may be applied and accepted. When they approach full charge, the energy input should again be decreased to prevent overheating, since the conversion efficiency of the battery again decreases. The instant invention, which controls voltage responsive to current, provides an energy output that is quite well-matched to the energy conversion efficiency of a storage battery being charged.

Numerous modifications and variations of the disclosed circuitry for accomplishing the objectives, teachings and advantages of the disclosed invention will become apparent to one skilled in the art, and be made without departing from the scope of the claimed invention.

I claim:

1. A power supply for charging a storage battery, comprising:
   power supply means adapted to be connected to a source of electrical energy for supply power;
   rectifying means operatively connected to said power supply means for rectifying the supplied power;
   output transformer means operatively connected to said rectifying means and to said battery for transforming said rectified power;
   power switching means operatively connected to said output transformer means for controlling a flow of current from said rectifying means through said output transformer means;
   pulse width modulator means operatively connected to said power switching means for controlling said power switching means, with a coupling transformer interposed between said pulse width modulator means and said power switching means;
   current sensing means for sensing said flow of current through said output transformer means;
   current limiting means responsive to said current sensing means and operatively connected to said pulse width modulator means for controlling said pulse width modulator means;
   charging voltage control means responsive to said current sensing means and operatively connected to said pulse width modulator means for controlling said pulse width modulator means;
   latch means for stopping said pulse width modulator means operatively connected to said pulse width modulator means;
   overcurrent sensing means responsive to said current sensing means operatively connected to said latch means for controlling said latch means;
   means for sensing the absense of said storage battery operatively connected to said latch means for controlling said latch means; and
   end-of-charge sensing means operatively connected to a terminal of said battery and to said latch means for controlling said latch means responsive to a predetermined voltage present at said terminal.

2. A power supply according to claim 1, further comprising:
   timer means operatively connected to said pulse width modulator means for stopping said pulse width modulator means after the passage of a predetermined period of time.

3. A power supply according to claim 1, wherein:
   said current sensing means includes a toroidal transformer.

4. A power supply according to claim 1, wherein:
   said overcurrent sensing means includes a zener diode.

5. A power supply according to claim 1, wherein:
   an indicator is connected before the output transformer means.

6. A power supply according to claim 1, wherein:
   said pulse width modulator means is an integrated circuit regulating pulse width modulator and further includes an amplifier means operatively connected to said intergrated circuit.

7. A power supply according to claim 1, wherein:
   said rectifying means includes voltage doubler means for doubling an output voltage of said rectifying means when said power supply means is connected to a supply of electrical energy at a first predetermined low voltage.

8. A power supply according to claim 1, wherein:
   said latch means includes indicator means for providing an indication that said pulse width modulator means has been stopped by said latch means.

9. A power supply according to claim 1, wherein:
   said rectifying means is adapted to be changed from a voltage doubling rectifier to a full-wave bridge rectifier by changing the interconnection of said power supply means and said rectifying means.

10. A power supply for charging a storage battery, comprising:
    power supply means adapted to be connected to a source of electrical energy for supplying power;
    rectifying means operatively connected to said power supply means for rectifying the supplied power;

output transformer means operatively connected to said rectifying means and to said battery for transforming said rectified power;

power switching means operatively connected to said output transformer means for controlling a flow of current from said rectifying means through said output transformer means;

pulse width modulator means operatively connected to said power switching means for controlling said power switching means, with a coupling transformer means interposed between said pulse width modulator means and said power switching means;

current sensing means for sensing said flow of current through said output transformer means;

current limiting means responsive to said current sensing means and operatively connected to said pulse width modulator means for controlling said pulse width modulator means;

charging voltage control means responsive to said current sensing means and operatively connected to said pulse width modulator means for controlling said pulse width modulator means;

latch means for stopping said pulse width modulator means, operatively connected to said pulse width modulator means;

overcurrent sensing means responsive to said current sensing means, operatively connected to said latch means for controlling said latch means;

means for sensing the absence of said storage battery, operatively connected to said latch means for controlling said latch means;

end-of-charge sensing means operatively connected to a terminal of said battery and to said latch means for controlling said latch means responsive to a predetermined voltage present at said terminal; and said latch means including first and second switch means, said first switch means being responsive to said overcurrent sensing means and said second switch means being responsive to said end-of-charge sensing means and to said means for sensing the absence of said battery.

11. A power supply according to claim 10, wherein:
said first switch means includes first indicator means; and said second switch means includes second indicator means;

said first indicator means providing an indication that said pulse width modulator has been stopped in response to said overcurrent sensing means; and said second indicator means providing an indication that said pulse width modulator has been stopped in response to one of said end-of-charge sensing means and said means for sensing the absence of said battery.

12. A power supply according to claim 10, wherein:
said pulse width modulator means is an integrated circuit regulating pulse width modulator and further includes an amplifier means operatively connected to said integrated circuit.

13. A power supply according to claim 10, wherein:
said rectifying means includes voltage doubler means for doubling an output voltage of said rectifying means when said power supply means is connected to a supply of electrical energy at a first predetermined low voltage.

14. A power supply according to claim 10, wherein:
said latch means includes indicator means for providing an indication that said pulse width modulator means has been stopped by said latch means.

15. A power supply according to claim 10, wherein:
said rectifying means is adapted to be changed from a voltage doubling rectifier to a full-wave bridge rectifier by changing the interconnection of said power supply means and said rectifying means.

16. A power supply according to claim 10 wherein:
(a) said overcurrent sensing means includes a zener diode.

* * * * *